United States Patent [19]
Saiz

[11] Patent Number: 6,138,946
[45] Date of Patent: Oct. 31, 2000

[54] DEVICE FOR LIFT AND TO REDUCE RESISTANCE TO AIRCRAFT ADVANCE

[76] Inventor: Manuel Munuoz Saiz, San Emilio 16, 1, 3, Madrid, Spain, 28017

[21] Appl. No.: 09/130,714

[22] Filed: Aug. 7, 1998

Related U.S. Application Data

[63] Continuation-in-part of application No. 09/095,957, May 4, 1998, and a continuation-in-part of application No. 09/127, 476, Jul. 31, 1998, Pat. No. 6,053,453.

[30] Foreign Application Priority Data

| Aug. 7, 1997 | [ES] | Spain | 9701753 |
| Mar. 10, 1998 | [ES] | Spain | 9800511 |

[51] Int. Cl.$^7$ ........................................ B64C 1/16
[52] U.S. Cl. .................. 244/13; 244/53 B; 244/55; 244/65; 244/12.4; 244/56; 244/36
[58] Field of Search ................. 244/13, 15, 30, 244/53 R, 62, 55, 74 R, 73 R, 12.4, 53 B, 56, 66, 36, 12.5

[56] References Cited

U.S. PATENT DOCUMENTS

| 1,188,849 | 6/1916 | Smith | 244/73 R |
| 1,585,281 | 5/1926 | Craddock | 244/73 R |
| 1,801,833 | 4/1931 | Allen | 244/12.4 |
| 2,115,711 | 5/1938 | Finley | 244/73 R |
| 3,027,118 | 3/1962 | Willox | 244/53 B |
| 3,161,379 | 12/1964 | Lane | 244/36 |
| 3,700,189 | 10/1972 | Timperman | 244/12.4 |
| 4,474,345 | 10/1984 | Musgrove | 244/23 D |
| 5,289,995 | 3/1994 | Greene | 244/15 |

*Primary Examiner*—Galen L. Barefoot
*Attorney, Agent, or Firm*—Robert M. Schwartz

[57] ABSTRACT

The device for lift and to reduce forward resistance of aircraft consists of a converging input duct of truncated-cone-shaped or truncated-pyramid-shaped, arranged lengthwise inside the fuselage and inclined to the longitudinal axis, with the larger opening coinciding with the front fuselage contour or periphery of maximum cross-section, and reducing in bore backwards so that its generatrix or lower side coincides with the lower surface of the fuselage parallel to the aircraft's longitudinal axis and the generatrix or upper edge forms an acute angle with the aircraft's longitudinal axis. The narrowest end of the duct discharges into the input of the turbofan, UHD, etc. type drive engines which discharge through a rear outlet duct facing backwards with the rear end curved slightly downward.

11 Claims, 2 Drawing Sheets

US 6,138,946

DEVICE FOR LIFT AND TO REDUCE RESISTANCE TO AIRCRAFT ADVANCE

CROSS-REFERENCES TO RELATED APPLICATIONS

This is a continuation-in-part of application Ser. No. 09/095,957 filed May 4, 1998, and a continuation-in-part of an application titled, "Improvement to Aircraft And High Speed Vehicles," invented by Manuel Muñoz Saiz having Ser. No. 09/127,476 and filing date Jul. 31, 1998, now U.S. Pat. No. 6,053,453.

This patent claims the priority date of Spanish Patent Application P9800511 filed on Mar. 10, 1998; Spanish Patent Application P9701753 filed on Aug. 7, 1997; and Spanish Patent Application P9601904 filed on Sep. 6, 1996. The basis for priority in this case is the Paris Convention for the Protection of Industrial Property (613 O.G. 23, 53 Stat 1748). The Spanish patent application was filed in The Official Patent and Trademark Office of Spain.

BACKGROUND OF THE INVENTION

1. Field of the Invention

The present invention relates to aircrafts that use big, longitudinally-extending intake ducts. More specifically, the invention relates to vertical and short takeoff and landing aircrafts.

2. Description of the Prior Art

This invention is a continuation-in-part of previous applications entitled, "IMPROVEMENT TO AIRCRAFT AND HIGH SPEED VEHICLES." These applications combine the advantages of the frontal inclination of the fuselage in generating lift with existing inner fuselage flow ducting systems which do not produce lift or greatly reduce frontal resistance to forward movement.

SUMMARY OF THE INVENTION

The device for lift and to reduce forward resistance of aircraft comprises a converging input duct of truncated-cone-shaped or truncated-pyramid-shaped arranged lengthwise inside the fuselage and inclined to the longitudinal axis, with the larger opening coinciding with the front fuselage contour or periphery of maximum cross-section, and reducing in bore backwards so that its generatrix lower side coincides with the lower surface of the fuselage parallel to the aircraft's longitudinal axis and the generatrix upper edge forms an acute angle with the aircraft's longitudinal axis. The narrowest end of the duct discharges into the input of the turbofan, UHD, or like drive engines which discharge through a rear outlet duct facing backwards with the rear end curved slightly downward. This allows the front cross-section of the fuselage to be very large without raising frontal resistance and perhaps reducing lateral resistance, particularly when length is reduced. The aircraft employs very fine wings which provide stability and support the flight controls. Because the engines are in the narrowest part of the duct, destabilisation does not occur if one of the engines stops.

The cockpit is located in front. The cockpit can be located at the top (10) or at the bottom.

On short aircraft, the output duct (7) is curved to coincide with the downward flow output (8) in the tail cone.

The ducting (5) and (8) and turbines can be of approximately the same inclination, FIG. 6.

One variant adds engines which rotate in relation to the aircraft's transverse axis (4). FIG. 7.

A further variant adds a fin (19) in the input duct and another at the outlet (21) to direct the input and output flow vertically.

Two valves in the top of the input duct (23) or two on the sides of the bottom part of the output duct (26) are operated by controls or actuators automatically controlled by gyroscopes.

The lower part of the nose may be slightly set back, to facilitate vision when the cockpit is located above.

Front lift can be considered a consequence of the impact of the air on the inclined frontal surface or because frontal suction is inclined.

In general, the intensities of the suction and impulsion forces must each be of a level and must be suitably located in relation to the center of gravity to produce even and stable aircraft lift. They can also be controlled in-flight.

The tail area may add the lift improvements in the Spanish patents mentioned above.

Advantages: lift is generated and frontal resistance is reduced throughout flight, and vertical flight is possible.

These valves also counteract the lift difference between the input and output openings.

The lower surface of the input can be eliminated, leaving the duct open at the bottom.

DETAILED DESCRIPTION OF THE PREFERRED EMBODIMENTS

Figure 1:
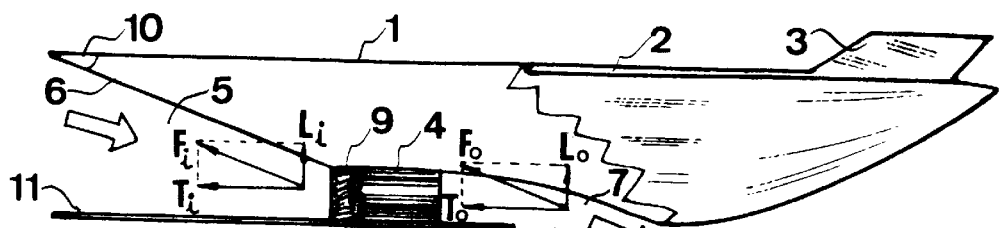
FIG. 1 shows a side, partial, schematic, cross-section view of the device in the invention.

FIG. 1 comprises the fuselage 1, the wings 2, the fins or rudders 3, the engines 4, the airflow inlet duct 5, the upper generatrix (also known as the side) of the duct 6, the outlet duct 7, the outlet port 8, the fan 9, the cockpit 10, and the generatrix (also known as the lower side) of the inlet duct 11. Where $F_i$ is the total force applied to the airflow at the inlet duct, $L_i$ is the lift and $T_i$ its thrust, $F_o$ is the total force applied to the airflow at the outlet duct, $L_o$ its lift, and $T_o$ its thrust. This arrangement produces constant lift and eliminates the frontal resistance during the flight.

Figure 2:
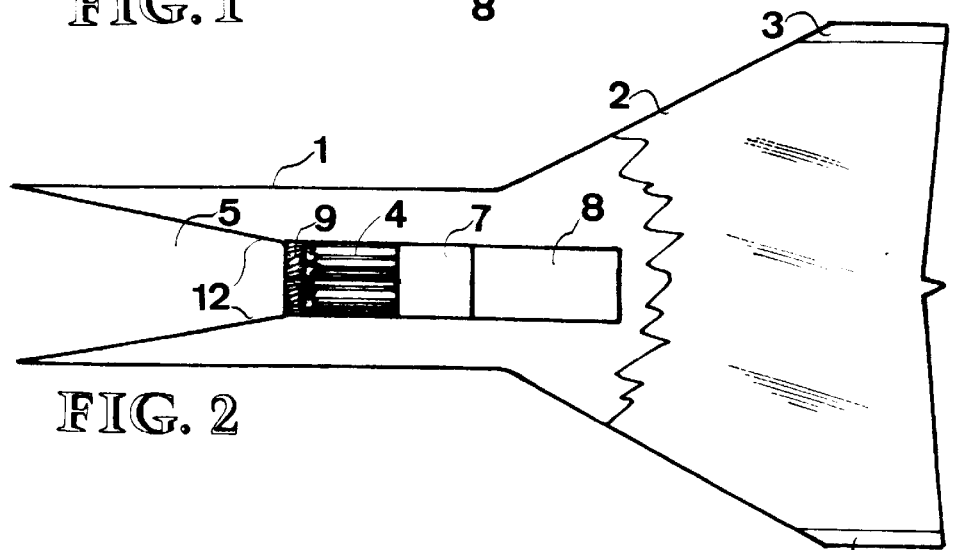
FIG. 2 shows a top, partial, schematic, cross-section view of the preceding device.

FIG. 2 comprises the fuselage 1, the wings 2, the fins, rudders or elevators 3 and 3', the engines 4, the airflow inlet duct 5, the outlet duct 7, the outlet port 8, the fan 9 and the side walls of the inlet duct 12.

Figure 3:
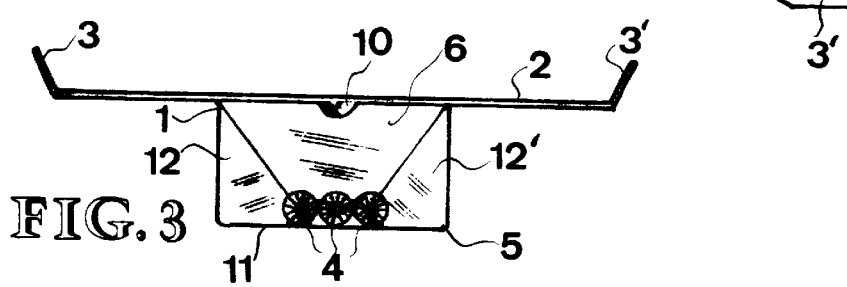
FIGS. 3 and 4 show front views of two different devices.

FIG. 3 comprises the fuselage 1, the wings 2, the fins rudders or elevators 3 and 3', the engines 4, the airflow inlet duct 5, the inclined upper surface 6, the cockpit 10, the lower surface of the inlet duct 11 and the side walls of the inlet duct 12 and 12'. This embodiment uses a truncated-pyramid-shaped inlet duct. The lower surface of the inlet duct and the adjacent surface of the fuselage can be eliminated, leaving the duct open at the bottom.

Figure 4:
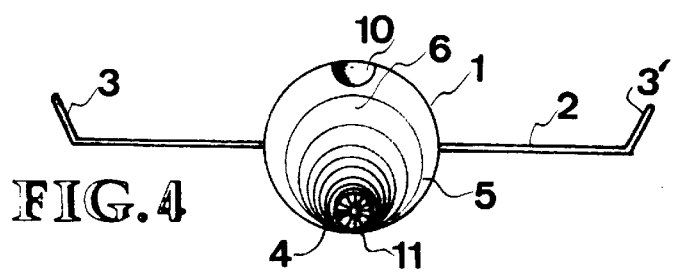

FIG. 4 comprises the fuselage 1, the wings 2, the fins, rudders or elevators 3 and 3', the engine 4, the airflow inlet duct 5, the upper inclined generatrix 6, the cockpit 10 and the lower generatrix of the inlet duct 11. This embodiment uses a truncated-cone-shaped inlet duct.

Figure 5:
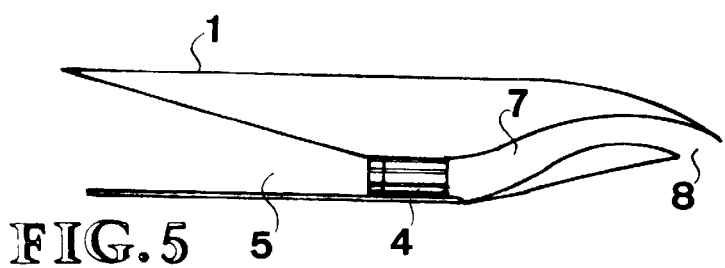
FIG. 5 to FIG. 8 show side, partial, schematic, cross-section views of different variants.

FIG. 5 comprises the fuselage 1, the engines 4, the inlet duct 5, the outlet duct 7, and the outlet port of the tail cone 8.

Figure 6:
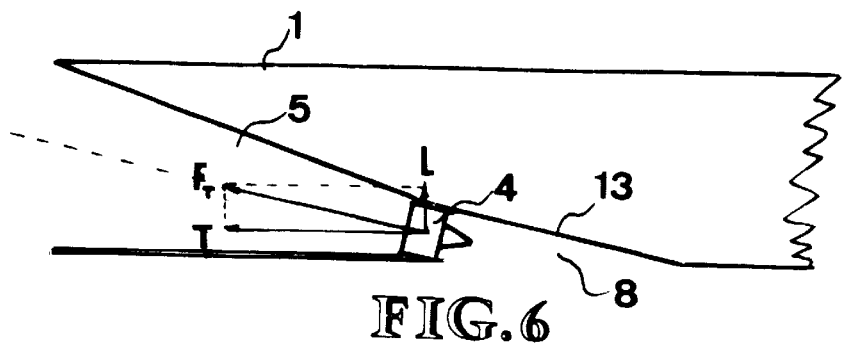

FIG. 6 comprises the fuselage 1, the engines 4, the inlet duct 5, and the upper surface of the outlet duct 13 and the outlet port 8. This embodiment uses inclined and aligned ducting and turbines. $F_T$ is the total impulsion force, T the total trust and L the total lift.

Figure 7:
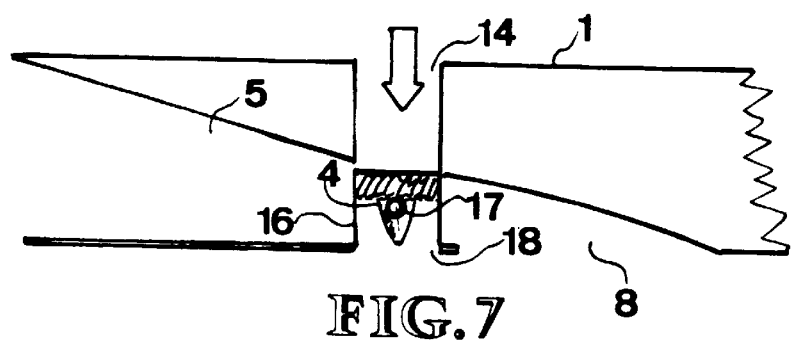

FIG. 7 comprises the fuselage 1, the rotating engines 4, the inlet duct 5, the outlet port 8, the upper inlet 14, the engine fairing 16, the rotating shaft of the engine 17 and the lower outlet port 18. This embodiment is typical for vertical take off.

Figure 8:
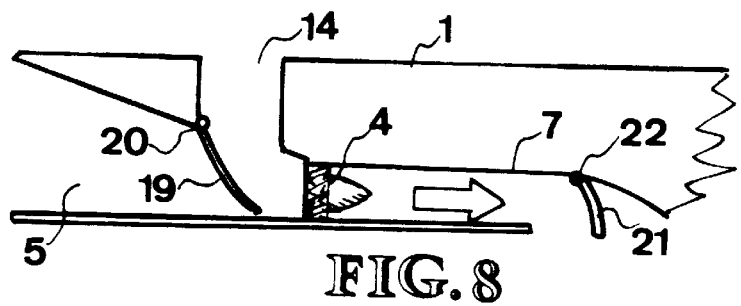

FIG. 8 comprises the fuselage 1, the engines 4, the inlet duct 5, the outlet duct 7, the upper inlet 14, the deflecting fin of the outlet airflow 21 and its rotating shaft 22. It is typical for vertical take off.

Figure 9:
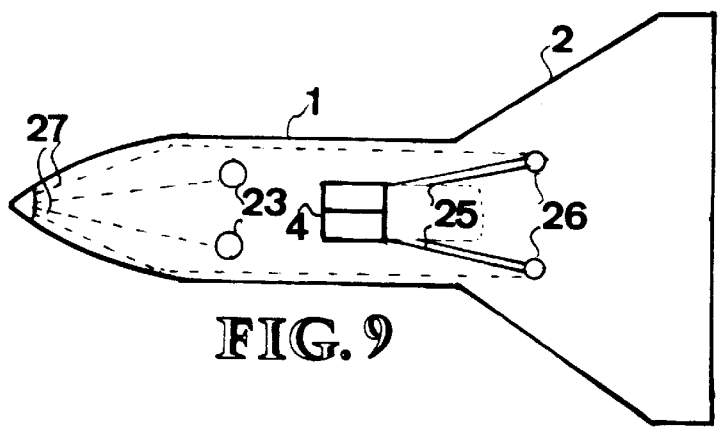
FIG. 9 shows a top, schematic view, a balance device.

FIG. 9 consists of the fuselage 1, the wings 2, the engines 4, the valves on the upper surface of the inlet duct 23, the ductings 25 to send the air toward the outlet air valves 26 on lower surface of the wing or fuselage and the transmission 27 of the control signal toward said valves. These valves also counteract the difference of lift between the inlet and outlet ports.

The arrows indicate the gas or airflow.

What is claimed is:

1. An aircraft for subsonic speed having a fuselage and a turbofan drive engine in said fuselage comprising:

an airflow inlet duct within said fuselage directing airflow into the turbofan of said engine, an outlet duct having an interior surface within said fuselage directing airflow from said turbofan, said fuselage having a longitudinal axis along the length of said fuselage, said inlet duct having an interior surface inside said fuselage and inclined to said longitudinal axis, with a larger opening coinciding with the front contour of said fuselage having a maximum cross-section of the periphery of said fuselage, and reducing in bore rearwards so that the lower generatrix of said inlet duct coincides with the lower surface of said fuselage and the upper generatrix of said inlet duct forms an acute angle with said longitudinal axis, whereby the narrowest end of said inlet duct discharges into the input of said turbofan;

said interior surface of said inlet duct and said interior surface of said outlet duct producing lift from impact air during flight;

said turbofan discharges said airflow through said rear outlet duct with the rear end of said outlet duct curved slightly downward, and wings attached to said fuselage which provide stability to said aircraft.

2. An aircraft for subsonic speed having a fuselage and a turbofan drive engine in said fuselage according to claim 1, wherein said interior surfaces of said inlet duct are in the shape of a truncated pyramid.

3. An aircraft for subsonic speed having a fuselage and a turbofan drive engine in said fuselage according to claim 1, wherein said interior surfaces of said inlet duct are in the shape of a truncated cone.

4. An aircraft for subsonic speed having a fuselage and a turbofan drive engine in said fuselage according to claim 1, wherein said fuselage further includes a cockpit at the front and at the top of said fuselage.

5. An aircraft for subsonic speed having a fuselage and a turbofan drive engine in said fuselage according to claim 1, wherein said interior surfaces of said outlet duct are curved slightly forward.

6. An aircraft for subsonic speed having a fuselage and a turbofan drive engine in said fuselage according to claim 1, wherein said inlet duct and said outlet duct and said turbofans have approximately the same inclination relative to said longitudinal axis.

7. An aircraft for subsonic speed having a fuselage and a turbofan drive engine in said fuselage according to claim 1, further comprising that said engine of said aircraft rotates in relation to the aircraft's transversaxis.

8. An aircraft for subsonic speed having a fuselage and a turbofan drive engine in said fuselage according to claim 1, comprising a fin in said input duct and a second fin at said outlet duct whereby said input and output airflow is vertical.

9. An aircraft for subsonic speed having a fuselage and a turbofan drive engine in said fuselage according to claim 1, further comprising:

two valves in the top of said inlet duct, and two valves on the sides of the bottom part of said outlet duct, are automatically controlled by gyroscopes.

10. An aircraft for subsonic speed having a fuselage and a turbofan drive engine in said fuselage according to claim 1, wherein the lower part of the nose of said aircraft is slightly set back.

11. An aircraft for subsonic speed having a fuselage and a turbofan drive engine in said fuselage according to claim 1, wherein said lower surface of said inlet duct and the adjacent surface of said fuselage are eliminated, leaving said inlet duct open at the bottom of said fuselage.

* * * * *